Jan. 26, 1943.  W. J. BUFORD  2,309,235
BALL COCK CONSTRUCTION
Filed June 23, 1941
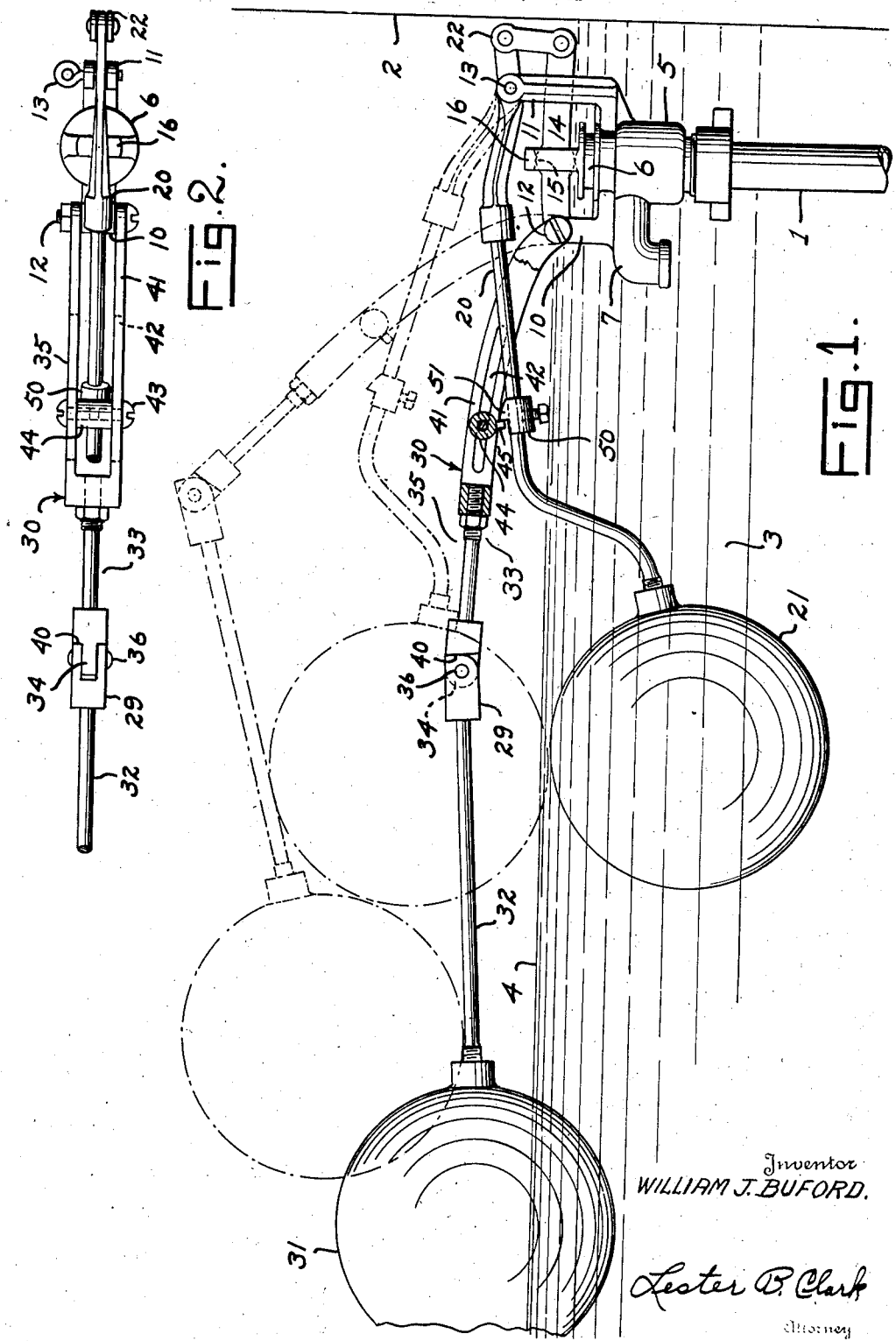
Inventor
WILLIAM J. BUFORD.
Lester P. Clark
Attorney Patented Jan. 26, 1943

2,309,235

UNITED STATES PATENT OFFICE 2,309,235

BALL COCK CONSTRUCTION

William J. Buford, Houston, Tex., assignor of ten per cent to L. H. Williams, Houston, Tex.

Application June 23, 1941, Serial No. 399,255

2 Claims. (Cl. 137—104)

This invention relates to a ball cock valve of the type used for admitting liquids to a predetermined depth in reservoirs such as water closets.

The usual ball cock valve consists essentially of a valve provided with a closing lever having a ball thereon to float upon the rising liquid in the reservoir and to gradually close the valve as the surface of the liquid approaches a predetermined level. Such a valve gradually throttles the influx of liquid into the reservoir as closure of the valve is approached. The throttling of the liquid produces a hissing sound and frequently a series of hydraulic impacts which are annoying and which are also destructive to the plumbing in the system with which the valve is used. Furthermore the throttling of the liquid prolongs the time required to bring the liquid in the reservoir to the desired predetermined level.

The primary object of the invention is to provide a device of the class described in which the valve is maintained fully opened until the desired amount of liquid has passed through the valve.

Another object is to provide a device of the class described in which the valve is quickly closed when the desired amount of liquid has been admitted therethrough.

A further object is to provide a ball cock valve having means for restraining the ball and lever from upward movement until a sufficient amount of liquid has been admitted through the valve.

Another object is to provide additional means for releasing the ball and lever when the liquid has risen to a predetermined level so that the valve actuating ball float may rise and close the valve.

A still further object is to provide a valve which is simple and inexpensive to construct and which is positive and efficient in operation.

A more specific object is to provide a ball cock valve having a second ball float and associated mechanism operated thereby to permit the valve actuating ball and lever to rise when the liquid admitted through the valve has reached a predetermined level.

The foregoing objects are primary objects and will, together with other objects, be more fully apparent from a consideration of the following description taken in connection with the accompanying drawing in which:

Fig. 1 is a side elevational view of a device embodying the invention;

Fig. 2 is a plan view of the construction shown in Fig. 1.

Referring to the drawing, the numeral 1 indicates a pipe which is connected to a source of liquid under pressure, such pipe entering a reservoir of which an end wall is shown at 2, it being intended that the liquid 3 shall be admitted in sufficient quantity that the valve will be closed when the surface 4 of the liquid reaches the indicated level.

The valve body 5 is attached to the pipe 1 and is provided with a vertically movable valve member 6 which is adapted to close by downward movement and thus to close the passage from the pipe 1 to and through the spout 7 comprising an integral part of the body 5. The mechanism for controlling the movement of the valve member 6 will now be described.

Two pairs of spaced upwardly extending ears 10 and 11 integral with the body 5 are provided with transverse openings to receive pivot pins 12 and 13. The pivot pin 12 passes through an opening in one end of the arm 14 so that such arm is pivoted for limited movement of the other end which passes between the ears of the pair 11 below the pivot pin 13. Intermediate its ends the arm 14 has a vertical enlargement 15 which fits within an opening in the loop 16 at the upper end of the valve member 6 so that vertical movement of the outer end of the arm 14 will effect proportional movement of the valve member.

A lever 20 is mounted upon the pivot pin 13 and carries at its outermost end the ball float 21. The opposite end of this lever is pivotally attached through links 22 to the outer end of the arm 14 so that movement of the lever 20 from the rising and falling movement of the ball float 21 will cause lowering and rising of the valve member 6 so that the valve is closed and opened thereby.

A second lever and ball float assembly 30 constitutes an important feature of the invention. The ball float 31 is attached to the outer end of a rod 32 which comprises one section of a composite lever generally referred to as 33. The inner end of the rod 32 is enlarged at 29 and is bifurcated to fit about a tongue 34 at the outer end of member 35. The members 32 and 35 are interconnected by means of the pivot 36 and the enlargement 39 is provided with a flattened end surface at 40 to engage a complementary surface adjacent the tongue 34 on the member 35 so that the upward pivotal movement of the ball 31 and the rod 32 is limited. By means of this construction, as will more fully appear in the description of the operation of the device, the ball 31 and rod 32 may move downwardly independent of the member 35. When, however, the ball 31 has risen sufficiently that the surface 40 engages the complementary adjacent surface, the rod 31 and member 35 are thereafter moved as a unit as the ball 31 moves upwardly.

The portion 35 of the composite lever 30 is provided with elongated bifurcations 41 which are slotted at 42 to receive screws 43 which are threadedly secured to the ends of a stop 44 having an ear 45 thereon. It is obvious that the screws 43 and the associated stop 44 may be adjustably positioned as desired along the slot 42.

A collar 50 is provided upon the lever 20 and such collar has an upwardly extending ear 51 which is engageable by the ear 45 on the stop 44. It seems apparent that the engagement of the stop 44 and the collar 50 is instrumental in preventing upward movement of the lever 20. The ball float 21 is thus locked against upward movement which tends to take place because of the liquid rising within the reservoir about the valve assembly.

The operation of the construction is believed apparent from the foregoing description. By way of illustration it will be assumed that water has been exhausted from about the valve assembly whereupon ball floats 21 and 31 will move downwardly with the surface of the liquid in the reservoir. During such downward movement the ear 45 will pass over the complementary ear 51 on the collar 50 and at the same time the valve member 6 is moved upwardly to admit fluid through the valve body 5 to the reservoir.

As liquid rises within the reservoir the ball float 21 will move upwardly until the ears 45 and 51 are in engagement whereupon the ball float 21 is restrained from further upward movement and the valve member 6 remains in open position so that liquid is admitted to the reservoir through the spout 7 of the valve body 5.

The ball float 31 rises with the liquid in the reservoir and the shoulder 40 on the enlargement 29 engages the complementary surface on the member 35. Continued upward movement of the ball float 31 lifts the member 35 until the ears 45 and 51 become disengaged. Thereupon the ball float 21 rises quickly upwardly whereby the valve member 6 is moved to seating position and the introduction of liquid to the reservoir is terminated. When this operation has taken place the respective parts of the mechanism will have assumed the positions indicated in dotted outline in Fig. 1 of the drawing.

Broadly the invention comprehends an improved ball cock valve construction which is so constructed and arranged that the valve is maintained fully open until the desired amount of liquid has passed through the valve.

What is claimed is:

1. A ball cock valve construction for admission of liquid to a predetermined depth thereabout comprising, a valve body, a valve, a float lever pivoted at one side of the body and adapted upon movement of the float lever by water admitted through the valve to move the valve to closed position, a second float lever pivoted on the body opposite said first mentioned float lever and having elongated bifurcations astride the first mentioned float lever, a stop between said bifurcations, means for adjustably securing said stop along the bifurcations, and a stop collar secured to said first mentioned float lever and engageable with said stop to lock the first mentioned float lever in lowered position until liquid has risen to a predetermined level to lift the second float lever and release the engagement between the stop and stop collar, said second float lever including a hinged outer portion movable freely downwardly relative to the bifurcated portion but engageable with the latter during upward movement so that both portions move as a unit to release the interlock between the levers.

2. A float and valve construction for water flush tanks including a pair of levers pivoted at spaced points to the valve structure, a float on each lever, one of said levers having spaced slotted arms thereon, a stop member adjustable in said slots, the other of said levers being disposed between said arms, means thereon to engage said stop to latch said last lever against further rise until the water raises the first float and lever sufficiently to release said stops.

WILLIAM J. BUFORD.